UNITED STATES PATENT OFFICE.

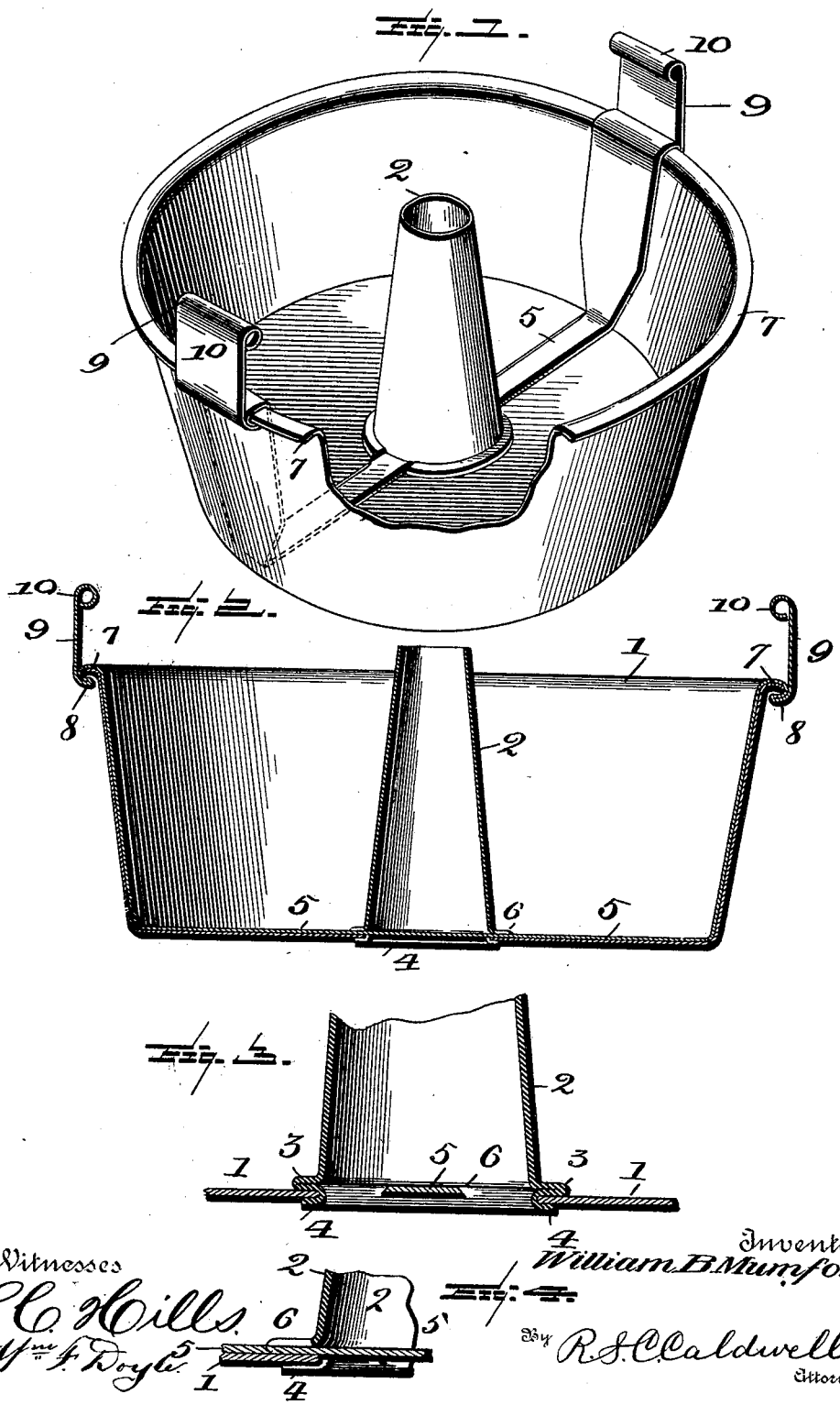

WILLIAM B. MUMFORD, OF KANSAS CITY, MISSOURI.

CAKE-PAN.

SPECIFICATION forming part of Letters Patent No. 646,529, dated April 3, 1900.

Application filed June 17, 1899. Serial No. 720,902. (No model.)

*To all whom it may concern:*

Be it known that I, WILLIAM B. MUMFORD, a citizen of the United States, residing at Kansas City, in the county of Jackson and State of Missouri, have invented certain new and useful Improvements in Cake-Pans; and I do hereby declare the following to be a full, clear, and exact description of the invention, such as will enable others skilled in the art to which it appertains to make and use the same.

My invention relates to certain new and useful improvements in cake-pans, and has for one object to produce such a pan which after having a cake or the like baked therein will be adapted to sever itself from the contents without waste or difficulty.

A further object is to provide, in combination with the device above mentioned, suitable means whereby the pan can be supported in an inverted position before the removal of its contents for the sweating process.

With these and other objects in view my invention consists in an ordinary pan with the cone center piece; but said cone instead of being rigidly connected to the pan-bottom, as usual, is loosely mounted therein, so as to be capable of turning on its central axis. Passing through the base of this cone and extending diametrically across the bottom and up the opposite sides of the pan is a cutter-blade of sheet metal, which after being bent near both ends over and around the rim of the pan has its ends projecting upward and terminated in loops.

My invention further consists in the novel details of construction and combination of parts to be fully described in the following specification and clearly set forth in the claims.

Referring to the accompanying drawings, forming part of this specification, in which like characters of reference indicate similar parts throughout, Figure 1 is a perspective view of my improved cake-pan with a portion broken therefrom to clearly show the arrangement of parts. Fig. 2 is a central vertical sectional view thereof. Fig. 3 is an enlarged vertical sectional view of a fragment of my pan, taken on a plane at right angles to that of Fig. 2 and showing the method of connecting the cone to the pan-bottom; and Fig. 4 is a similar view taken in the same plane as Fig. 2.

In the drawings, 1 denotes the pan proper, with a circular central opening in its bottom, in which fits the cone 2 by having its base struck out to form an annular bead 3, resting on the top side of the pan-bottom, and its lower edge then passed through the opening and finally turned outward, forming a flange 4 to bear on the under side of the pan-bottom. This connection has a working fit, so that the cone may be free to turn in the pan; but its engagement is sufficient to retain the cone in its relative position.

A cutter-blade 5, consisting of a strip of sheet metal with its top edges beveled to form cutting-surfaces, passes through slots 6 in the base of the cone and extends diametrically across the bottom of the pan, in close contact therewith. Each end of the cutter-blade then passes up the side of the pan, over and around the rim 7, doubling upon itself to form a hook 8, engaging the rim, and finally projecting upward, forming an ear 9, terminating in a loop 10. At the bends of the cutter-blade, where it starts up the sides of the pan, it gradually widens until about twice the width of the horizontal portion and continues of this width throughout its remainder. By this arrangement the cutter-blade is comparatively narrow in its middle portion to pass through the base of the cone without materially weakening its engagement with the pan; but the increase in width has the effect of stiffening the upright portions to render them less liable to bend, increasing the engaging surface of the hooks 8 to prevent their rocking when pressure is applied, and lengthening the loops 9 to form better bearing-surfaces when the pan is inverted and supported thereon.

From the foregoing it will be seen that a cake may be baked in my improved pan in the usual manner, and when the proper time arrives for the sweating process the pan may be inverted and supported on the ears 9 without the cake coming in contact with the stove.

When it is desired to remove the cake from the pan, it is only necessary to apply pressure to the ears 9, and thus cause the cutter-blade to revolve with the cone half a turn, when the cone frees itself from the center of the cake, and the cutter-blade passing between the bottom and sides of the pan and the cake cuts said cake clear, so it may be removed without trouble or danger of breaking.

It is obvious that numerous changes in the details of construction and arrangement of parts from those herein described may be resorted to without departing from the spirit and scope of my invention, such as dispensing with one-half of the cutter-blade and using the single arm to cut the cake loose by a complete revolution.

Having fully described my invention, what I claim as new, and desire to secure by Letters Patent, is—

1. In combination, a pan, a center piece mounted therein, and a cutter-blade connected to and adapted to turn said center piece, substantially as described.

2. In combination, a pan, a center piece loosely mounted therein, and a cutter-blade passing through the base of the center piece with the ends of said blade extending up the sides of the pan, substantially as described.

3. In combination, a pan, a center piece loosely mounted therein, a cutter-blade connected to the center piece and extending up the side of the pan and a projection on the cutter-blade, by which the center piece may be turned, substantially as described.

4. In combination, a pan, a cone mounted therein, a cutter-blade passing through the base of the cone and extending up the sides of the pan, hooks formed on the cutter-blade to engage the rim of the pan, and ears projecting therefrom, substantially as described.

5. In combination, a pan, a cone loosely mounted therein, a cutter-blade passing through the base of the cone and extending up the sides of the pan, said cutter-blade having sharpened edges and being widened in its upright portions, hooks formed on the cutter-blade engaging the pan-rim, and ears projecting therefrom on which the pan may rest when inverted, substantially as described.

6. In a device of the character described, a pan having a central circular opening, a center piece consisting of a sheet-metal tube having its lower edge bent to form an annular flange, S shape in cross-section, engaged in the opening, and a cutter-blade extending through the center piece and along the bottom of the pan, substantially as described.

In testimony whereof I affix my signature in presence of two witnesses.

WILLIAM B. MUMFORD.

Witnesses:
JAMES G. YOUNG,
F. T. CHESNEY.